United States Patent
Yasaee

(10) Patent No.: US 9,682,527 B2
(45) Date of Patent: Jun. 20, 2017

(54) LAMINATED COMPOSITE STRUCTURE AND RELATED METHOD

(71) Applicant: ROLLS-ROYCE PLC, London (GB)

(72) Inventor: Mehdi Yasaee, Bristol (GB)

(73) Assignee: ROLLS-ROYCE plc, London (GB)

( * ) Notice: Subject to any disclaimer, the term of this patent is extended or adjusted under 35 U.S.C. 154(b) by 59 days.

(21) Appl. No.: 14/549,002

(22) Filed: Nov. 20, 2014

(65) Prior Publication Data

US 2015/0165721 A1   Jun. 18, 2015

(30) Foreign Application Priority Data

Dec. 17, 2013 (GB) .................................. 1322274.0

(51) Int. Cl.
*B32B 3/06* (2006.01)
*B32B 5/00* (2006.01)
(Continued)

(52) U.S. Cl.
CPC ............... *B32B 3/06* (2013.01); *B29C 70/24* (2013.01); *B32B 3/00* (2013.01); *B32B 3/26* (2013.01); *B32B 3/266* (2013.01); *B32B 5/00* (2013.01); *B32B 5/02* (2013.01); *B32B 5/06* (2013.01); *B32B 5/10* (2013.01); *B32B 5/22* (2013.01); *B32B 5/24* (2013.01); *B32B 5/26* (2013.01); *B32B 5/28* (2013.01); *B32B 7/00* (2013.01); *B32B 7/02* (2013.01); *B32B 7/04* (2013.01); *B32B 7/08* (2013.01); *B32B 19/02* (2013.01); *B32B 19/04* (2013.01); *B32B 27/00* (2013.01); *B32B 27/02* (2013.01); *B32B 27/04* (2013.01);
(Continued)

(58) Field of Classification Search
None
See application file for complete search history.

(56) References Cited

U.S. PATENT DOCUMENTS 3,030,256 A * 4/1962 Rosenthal ........... B29C 67/2295
156/148
3,834,832 A * 9/1974 Mallinder ............... B29C 65/56
416/230
(Continued)

FOREIGN PATENT DOCUMENTS

EP     2302166 A2    3/2011
GB     1411379 A     10/1975
(Continued)

OTHER PUBLICATIONS

Feb. 23, 2015 Search Report issued in European Application No. 14193980.
(Continued)

*Primary Examiner* — Humera Sheikh
*Assistant Examiner* — Lucas Wang
(74) *Attorney, Agent, or Firm* — Oliff PLC

(57) ABSTRACT

There is disclosed a laminated composite structure (12) having a plurality of laminae (13) formed of composite material, and at least one reinforcing pin (3) provided within the structure so as to extend between adjacent laminae (13). The at least one reinforcing pin (3) is formed from a plurality of interlaced metal filaments (1, 2). There is also disclosed a related method for reinforcing a laminated composite structure (12) via the use of at least one said reinforcing pin (3).

13 Claims, 2 Drawing Sheets

| (51) | Int. Cl. | |
|---|---|---|
| | B32B 5/02 | (2006.01) |
| | B32B 5/06 | (2006.01) |
| | B32B 5/10 | (2006.01) |
| | B32B 5/22 | (2006.01) |
| | B32B 5/24 | (2006.01) |
| | B32B 5/26 | (2006.01) |
| | B32B 5/28 | (2006.01) |
| | B32B 7/00 | (2006.01) |
| | B32B 7/02 | (2006.01) |
| | B32B 7/04 | (2006.01) |
| | B32B 7/08 | (2006.01) |
| | B32B 19/02 | (2006.01) |
| | B32B 19/04 | (2006.01) |
| | B32B 27/00 | (2006.01) |
| | B32B 27/02 | (2006.01) |
| | B32B 27/04 | (2006.01) |
| | B32B 27/06 | (2006.01) |
| | B32B 27/12 | (2006.01) |
| | B32B 27/28 | (2006.01) |
| | B32B 3/00 | (2006.01) |
| | B32B 3/26 | (2006.01) |
| | B29C 70/24 | (2006.01) |

(52) U.S. Cl.
CPC ............... *B32B 27/06* (2013.01); *B32B 27/12* (2013.01); *B32B 27/28* (2013.01); *Y10T 29/49826* (2015.01); *Y10T 428/12333* (2015.01); *Y10T 428/192* (2015.01)

(56) References Cited

U.S. PATENT DOCUMENTS

| 5,972,524 A | 10/1999 | Childress | |
|---|---|---|---|
| 2002/0037409 A1 | 3/2002 | Tunis | |
| 2013/0149501 A1* | 6/2013 | Pacchione | B29C 65/364 428/172 |

FOREIGN PATENT DOCUMENTS

| GB | 1500776 A | 2/1978 |
|---|---|---|
| WO | 2004085141 A1 | 10/2004 |

OTHER PUBLICATIONS

Jun. 10, 2014 Search Report issued in British Patent Application No. 1322274.0.

* cited by examiner

LAMINATED COMPOSITE STRUCTURE AND RELATED METHOD

CROSS-REFERENCE TO RELATED APPLICATIONS

This application is based upon and claims the benefit of priority from British Patent Application Number 1322274.0 filed 17 Dec. 2013, the entire contents of which are incorporated by reference.

BACKGROUND

1. Field of the Disclosure

The present disclosure relates to laminated composite structure, and more particularly relates a composite laminated structure having at least one reinforcing pin. The disclosure also relates to a method for reinforcing a laminated composite structure.

2. Description of the Related Art

It is well known in the field of composite structures that two-dimensional composite laminates are relatively weak in the so-called "through thickness" or z-direction. At the interfaces between adjacent laminae in such structures there is a high tendency for the plies to debond or delaminate. This problem has been found to be particularly prevalent in composite laminates in which adjacent laminae have constituent fibres which are not aligned. This problem has therefore led to the development of various types of "through-thickness-reinforcement", commonly known by the acronym TTR, such as z-pinning, stitching, tufting, and three-dimensional weaving, all of which will be well known to those of skill in the art.

Z-pinning is a technique whereby a plurality of small pins are inserted into an uncured laminated composite structure such that the pins extend between adjacent laminae in the structure, which provides a significant improvement in through-thickness strength and resistance to delamination of a composite structure. The most common type of pin insertion process is currently to use an ultra-sonic hammer and pre-formed arrays of pins. The pins are held in spaced relation to one another in a foam carrier. The foam carrier is positioned against a surface of the composite structure and the ultrasonic hammer is used to press the pins through and out of the foam and into the composite structure. This z-pinning technique requires the pins to have chamfered tips and for their outer surfaces to be relatively smooth. As the ultrasonic hammer urges the pins into the composite structure, it induces high frequency vibrations in them. The vibrating chamfered tips of the pins locally heat up and soften the matrix resin of the composite material, allowing the pins to penetrate the composite material with minimal disruption to the fibres. This process is efficient and has therefore become widely used for large-scale production of TTR composite structures. However, as indicated above, it places particular design requirements on the form of the pins which must be used.

Fibrous composite pins are widely used for z-pinning in order to reinforce composite structures. However, there are significant disadvantages in using this type of material for the pins. For example fibrous composite pins have a tendency to split during aggressive penetration of the structure to be reinforced, the material of the pins is rather brittle and can result in premature failure of the pins, and the pins will have a low transverse modulus and strength which reduces their effectiveness in shear loading of the reinforced structure.

For these reasons it has been proposed previously to use metal pins as an alternative. However, metal pins have heretofore suffered from a significant disadvantage themselves arising from the fact that their coefficient of thermal expansion is poorly matched to that of the composite materials which there are intended to reinforce. This can result in early debonding of the pins from the surrounding matrix material of the composite during the manufacturing process, thereby degrading the pins' reinforcing performance.

OBJECTS AND SUMMARY

It is an object of the present disclosure to provide an improved laminated composite structure. It is another object of the present disclosure to provide an improved method for reinforcing a laminated composite structure.

According to a first aspect, there is provided a laminated composite structure having a plurality of laminae formed of composite material, and at least one reinforcing pin provided within the structure so as to extend between adjacent laminae, wherein the or each said reinforcing pin is formed from a plurality of interlaced metal filaments.

Conveniently, said filaments are entwined along their length.

Advantageously, the or each said reinforcing pin is formed from two entwined metal filaments.

Each said metal filament may be provided in the form of a helix along the length the reinforcing pin, the helices of the two filaments being interlocked with one another.

Alternatively, said plurality of filaments of the or each reinforcing pin are plaited.

Conveniently, said interlaced metal filaments of the or each reinforcing pin define a corrugated outer surface to the reinforcing pin.

Optionally, at least one of said metal filaments is formed from steel.

Conveniently, at least one of said metal filaments is formed from a nickel-titanium alloy.

There is also proposed a reinforcing pin for use in a laminated composite structure of the type described above.

The laminated composite structure may be, for example, an organic matrix composite. The laminated composite structure may comprise organic matrix composite laminates, for example carbon fibre laminates. The laminated composite structure may comprise fibres (such as carbon fibres) formed in a plastic and/or epoxy resin matrix. The laminated composite structure may be a fibre reinforced plastic. The laminated composite structure is may be formed of laminates comprising fibres (such as carbon fibres) formed in a plastic and/or epoxy resin matrix, and/or laminates comprising fibre reinforced plastic.

According to a further aspect, there is provided a reinforcing pin for a laminated composite structure, the pin being formed from a plurality of interlaced metal filaments.

According to another aspect, there is provided a method for reinforcing a laminated composite structure having a plurality of laminae of composite material, the method comprising the steps of: forming at least one channel within the structure which extends through at least some of the laminae of the structure; providing at least one metal reinforcing pin sized for receipt within a respective said channel, inserting the or each reinforcing pin into a respective said channel; and at least partially curing the composite material; wherein the or each reinforcing pin is formed from a plurality of interlaced metal filaments.

Conveniently, the step of providing the or each metal reinforcing pin involves entwining said filaments along their length.

Advantageously, the or each pin is formed by entwining two said filaments along their length.

Said filaments may be initially provided in a straight configuration and then twisted around one another to form respective interlocked helices.

Alternatively, the step of providing the or each metal reinforcing pin involves plaiting said filaments along their length.

Conveniently, the interlaced metal filaments of the or each pin define a corrugated outer surface to the pin, and wherein the method further comprises curing a curable matrix of the composite material so that the matrix flows into corrugations in the outer surface of the pin to anchor the pin within its respective channel.

BRIEF DESCRIPTION OF THE DRAWINGS

So that the disclosure may be more readily understood, and so that further features thereof may be appreciated, embodiments of the disclosure will now be described by way of example with reference to the accompanying drawings in which.

DETAILED DESCRIPTION OF EMBODIMENTS

Turning now to consider FIG. 1 in more detail, there is shown a pair of substantially identical elongate metal filaments 1, 2 which are used to form a reinforcing pin for z-pinning reinforcement of laminated composite structures, as will be explained in more detail below. The filaments 1, 2 may be provided in the form of lengths of plastically deformable wire. Whilst it is envisaged that in most embodiments of the present disclosure the filaments will have a generally circular transverse cross-section, it is possible for the filaments to have alternative cross-sectional shapes and they may be, for example, polygonal in cross section.

The filaments may be formed from a ductile material having high tensile and transverse strength properties, such as steel or a nickel-titanium alloy.

Each filament 1, 2 has a cross-sectional thickness which is slightly less than half of the desired diameter of the reinforcing pin 3 (shown in FIG. 2) to be produced from the filaments. So for example, when producing a reinforcing pin of 0.28 mm diameter, it is envisaged that the two filaments 1, 2 will each have a cross sectional thickness slightly less than 0.14 mm in diameter; for example 0.10 to 0.12 mm.

Figure 1:
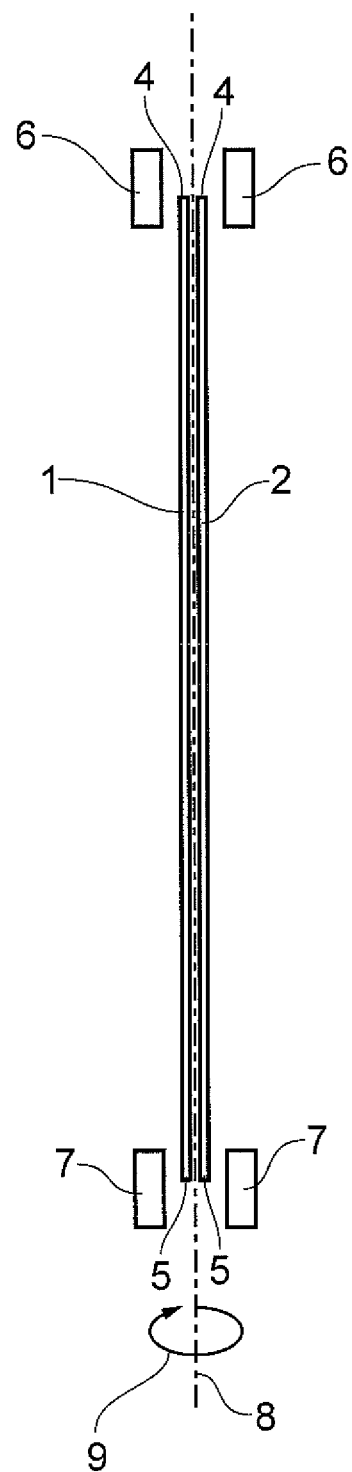
FIG. 1 shows a pair of elongate metal filaments.

FIG. 1 shows the two filaments 1, 2 arranged side-by-side and generally parallel to one another, with their upper and lower ends 4, 5 generally adjacent one another, and with each pair of ends 4, 5 being located between respective pairs of clamping members 6, 7. The clamping members 6, 7 of each pair can be moved towards one another so as to securely clamp the adjacent ends 4, 5 of the filaments against one another, whereupon the filaments will be brought into abutment along their length. With the ends 4, 5 of the filaments clamped secured in this manner, one or both pairs of clamping members 6, 7 are then rotated about the longitudinal axis 8 of the aligned filaments. For example, in the arrangement illustrated, the upper pair of clamping members 6 may be held stationary after they have been moved to clamp the upper ends 4 of the filaments 1, 2 therebetween, whilst the lower pair of clamping members 7 may be rotated about the axis 8 as indicated by the arrow 9. Alternatively, however, it is envisaged that the upper and lower pairs of clamping members 6, 7 may be simultaneously rotated about the axis 8 in opposite directions; for example the upper clamping members 6 may be rotated counter clockwise whilst the lower clamping members 7 are rotated clockwise.

Figure 2:
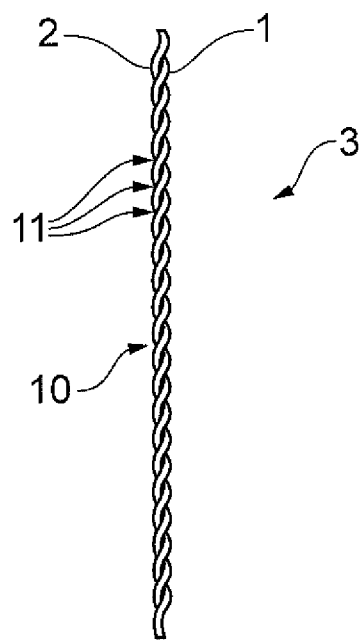
FIG. 2 shows the filaments of FIG. 2 interlaced with one another to form a reinforcing pin.

As will be appreciated, relative rotation of the clamped ends 4, 5 of the filaments 1, 2 as described above is effective to twist the filaments about one another along their length, such that they become entwined as illustrated in FIG. 2, to form the reinforcing pin 3. As will be noted, each filament 1, 2 has become plastically deformed so as to adopt the shape of an elongate helix, with the two helices being interlocked.

The resulting reinforcing pin 3 has an outer surface 10 which is defined by both of the filaments 1, 2. The outer surface 10 of the pin 3 is thus corrugated because of the configuration of the entwined filaments 1, 2, so as to have a plurality of corrugations 11 defined by the alternating turns of the now helically wound filaments 1, 2.

It is to be appreciated that whilst the filaments 1, 2 are described above as being twisted together to form a single reinforcing pin 3 as shown, for convenience and efficiency of production it is envisaged that long lengths of filaments 1, 2 may be twisted together so as to produce a long length of entwined stock, from which a plurality of identical reinforcing pins 3 may then be cut. Alternatively, it is envisaged that the long length of entwined stock wire could be used for alternative TTR techniques such as stitching or tufting.

It is also to be noted at this juncture, that whilst the reinforcing pin 3 has been described above with specific reference to the twisting together of only two filaments 1, 2 such that the two filaments 1, 2 become entwined, it is also possible to twist together three or more filaments 1, 2 in a similar manner to form reinforcing pins of alternative configurations. Furthermore, other configurations of reinforcing pin 3 are also envisaged in which a plurality of filaments are interlaced in other ways. For example, it is envisaged that three or more metal filaments could be plaited together along their length. Nevertheless, in all such variants, however the filaments are interlaced, it is envisaged that the resulting reinforcing is pins will all have a corrugated outer surface 10, albeit of slightly different configurations depending on how many filaments are used and how the filaments are interlaced.

Figure 3:
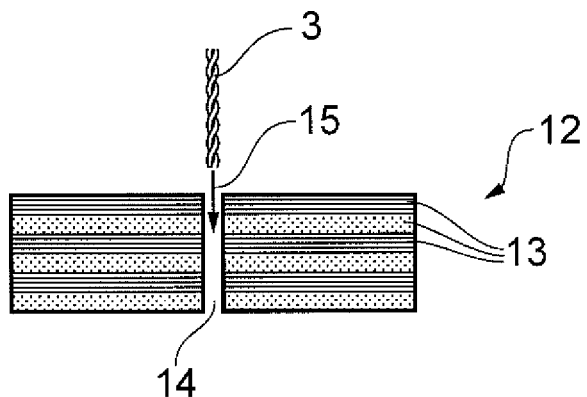
FIG. 3 is a schematic cross-sectional view showing a step in a method of reinforcing a laminated composite structure, in which the reinforcing pin of FIG. 2 is inserted into a channel provided in the composite structure.

Turning now to consider FIG. 3, there is illustrated a section of a laminated composite structure 12 which has a plurality of laminae 13, each comprising a plurality of fibres held in a curable resin matrix. The particular composite structure 12 illustrated is configured such that alternate laminae 13 have their constituent fibres arranged orthogonally to one another, but other fibre orientations are also possible.

In order to reinforce the composite structure 12 according to the present disclosure, a channel 14 is formed through a region of the structure so as to extend through the laminae 13. The channel 14 may be formed by initially softening the composite material via the application of heat, pressing a metal pin (not shown) through the laminae 13 and then removing the pin to leave the channel 14 as shown. The channel 14 has a diameter appropriate to receive a reinforcing pin 3 of the type described above as a close sliding fit.

FIG. 3 shows a subsequent step in the reinforcing method, in which the reinforcing pin 3 described above is then inserted axially into the preformed channel 14 as indicated by arrow 15.

Figure 4:
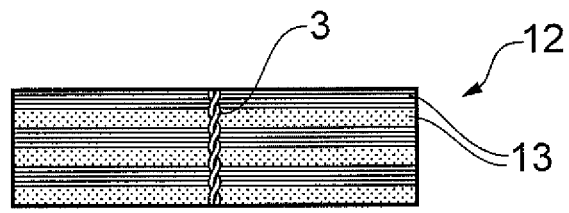
FIG. 4 is a schematic cross-sectional view similar to that of FIG. 3, but which shows the finished reinforced structure following a curing process.

FIG. 4 shows the reinforcing pin fully received within the preformed channel 14. As will be noted, in this position the pin 3 extends through and between adjacent laminae, thereby bridging the interfaces between adjacent laminae. Once the reinforcing pin 3 is received in the channel 14 as shown, the composite material of the structure is then cured, whereupon the matrix material will flow into the corrugations 11 in the outer surface 10 of the reinforcing pin, thereby securely anchoring the pin 3 within the composite structure 12.

As will be appreciated, it will be usual to reinforce a laminated composite structure 12 in this way by the use of a plurality of reinforcing pins 3, each pin being inserted into a respective preformed channel 14.

The present disclosure therefore provides a very convenient configuration of metal reinforcing pin with a corrugated outer surface 10, which therefore provides a reinforced laminated composite structure in which the ductility and strength of the metal pin 3 in both lateral and vertical directions provides superior TTR performance than prior art fibrous composite reinforcing pins.

When used in this specification and claims, the terms "comprises" and "comprising" and variations thereof mean that the specified features, steps or integers are included. The terms are not to be interpreted to exclude the presence of other features, steps or integers.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the disclosure in diverse forms thereof.

While the disclosure has been described in conjunction with the exemplary embodiments described above, many equivalent modifications and variations will be apparent to those skilled in the art when given this disclosure. Accordingly, the exemplary embodiments of the disclosure set forth above are considered to be illustrative and not limiting. Various changes to the described embodiments may be made without departing from the spirit and scope of the disclosure.

I claim:

1. A laminated composite structure having a plurality of laminae formed of composite material, and
at least one reinforcing pin provided within the structure so as to extend between adjacent laminae, wherein
the at least one reinforcing pin is formed from a plurality of interlaced metal filaments, and
the at least one reinforcing pin is only in contact with the plurality of laminae within an interior of the laminated composite structure.

2. The laminated composite structure according to claim 1, wherein
the metal filaments are entwined along their length.

3. The laminated composite structure according to claim 2, wherein
the at least one reinforcing pin is formed from two entwined metal filaments.

4. The laminated composite structure according to claim 3, wherein
the metal filaments are provided in the form of a helix along the length the reinforcing pin, the helices of the metal filaments being interlocked with one another.

5. The laminated composite structure according to claim 1,
wherein the metal filaments of the at least one reinforcing pin are plaited.

6. The laminated composite structure according to claim 1, wherein
the metal filaments of the at least one reinforcing pin define a corrugated outer surface to the reinforcing pin.

7. The laminated composite structure according to claim 1, wherein
at least one of the metal filaments is formed from steel or nickel-titanium alloy.

8. A method for reinforcing a laminated composite structure having a plurality of laminae of composite material, the method comprising the steps of:
forming at least one channel within the structure which extends through the plurality of laminae of the structure;
providing at least one metal reinforcing pin sized for receipt within a respective said channel, inserting the at least one reinforcing pin into a respective said channel; and
at least partially curing the composite material; wherein
the at least one reinforcing pin is formed from a plurality of interlaced metal filaments, and
the at least one reinforcing pin is only in contact with the plurality of laminae within an interior of the laminated composite structure.

9. The method according to claim 8, wherein
the step of providing the at least one reinforcing pin involves entwining the metal filaments along their length.

10. The method according to claim 9, wherein
the at least one reinforcing pin is formed by entwining two the metal filaments along their length.

11. The method according to claim 8, wherein
the metal filaments are initially provided in a straight configuration and are then twisted around one another to form respective interlocked helices.

12. The method according to claim 8, wherein
the step of providing the at least one reinforcing pin involves plaiting the metal filaments along their length.

13. The method according to claim 8, wherein
the metal filaments of the at least one reinforcing pin define a corrugated outer surface to the reinforcing pin, and
wherein the method further comprises curing a curable matrix of the composite material so that the matrix flows into corrugations in the outer surface of the reinforcing pin to anchor the reinforcing pin within its respective channel.

* * * * *